2,912,316

COMBINED BUG REPELLENT AND FERTILIZER

Temp Skinner, Phoenix, Ariz.

No Drawing. Application March 22, 1957
Serial No. 647,755

1 Claim. (Cl. 71—4)

This invention pertains to a combined fertilizer and bug repellent composition.

It is well known that plants when they first sprout are very vulnerable to certain types of insects, bugs and pests. Perhaps the most pernicious are the sap sucking pests such as aphis, red spider, thrip and the like. These pests live on the sap of the young plant and, while some actively eat the leaves nevertheless the leaves are eaten principally for their fluid content.

One of the objects of my invention is to provide, together with the means for stimulating plant growth, a compound which acts as a means for dissuading or repelling attacks of these insect pests.

Another object is to provide a compound which uses a fertilizing medium as a carrier or vehicle for a combination of substances which will permeate the soil in which the plants are grown and which will be taken up by the plants in small amounts and make them undesirable or offensive to the pests; at the same time the mixture of pest repellent chemicals is not poisonous and in fact makes the use of insecticides of the usual type unnecessary.

Another object is to provide a mixture of substances which will fertilize the soil on which the plants are grown and at the same time distribute and mix with the soil substances which are readily taken up by plants and which will render them offensive to numerous plant destroying insects.

Still another object is to provide a mixture as above described which may either be ground and applied to the soil directly or may be dissolved in or emulsified with irrigation water and applied to the soil, using the water as a vehicle.

Other objects will appear hereinafter.

I attain the foregoing objects by means of the composition of matter, mixture of elements and method hereinafter described.

First, to provide a base for the insect repellent chemicals I mix ½ gallon of treble calcium superphosphate with ½ gallon of liquid sulphur. These materials are thoroughly mechanically mixed and then allowed to react for about thirty minutes when the reaction between the two elements is complete.

Second, I prepare an insert repellent mixture consisting of: 4 gallons of crude molasses, 2 gallons of lime sulphur paste, ¼ gallon commercial cresote, ¼ gallon pine tar, ¼ gallon commercial fuel oil, ¼ ounce oil of pennyroyal, and ¼ ounce dioctyl sodium sulfosuccinate. These ingredients are fluid and are mixed with the base first mentioned.

Third, to provide a soil conditioning and fertilizing mixture which will form a semi-solid cake and which will act as a vehicle and means of application of the combined mixtures above mentioned, I provide a dry mixture consisting of: 200 pounds of calcium treble superphosphate, 100 pounds of potassium sulphate, 50 pounds cotton seed meal, and 100 pounds of urea.

These dry ingredients are thoroughly combined in a mechanical mixer and then the insect repellent fluid mixture of the first and second mixtures, above mentioned, is added and the whole thoroughly mixed.

When this is complete the resultant mixture is poured into fiberboard cartons to form cakes. Before these cakes dry completely I add liquid sulphur to the cake at the rate of 1 gallon to each 80 pounds of mixture. After this liquid sulphur has been absorbed it acts as a sealer and the mixture in cake form is ready for use.

In use, the cakes of the mixture may be broken up or coarsely ground and then applied to plant beds as a side dressing. Otherwise it may be worked into the soil with the seed as the ground is prepared for planting.

In addition to the above, or in place of it, a cake of the compound may be placed in irrigation water flowing onto the plant beds and allowed to dissolve and disseminate into the water.

It is to be noted that none of the ingredients above mentioned is an active poison. Any edible foods grown in soil containing this material need not be treated to remove traces of the material, as is necessary where insects are destroyed by active poisons, such as the arsenides or fluorides. The mixture does not directly poison the insects. On the other hand the mixture renders the soil, and plants grown therein, unpleasant and distasteful to the insects. This is due to both smell and taste. If insects are in the soil they tend to travel away from areas treated with the above described compound or composition of matter. If they are on plants in the treated area they will not sap the juice of the plants or eat the leaves because of the presence of the repellent chemicals. As a result the insects die of starvation in a very short time or are driven away from the treated area. On the other hand these chemical substances do not harm the plants.

It is to be noted that considering the whole mixture in the proportions above mentioned, the proportion of the repellent chemicals, such as creosote, etc., is small, and it would be impossible to properly distribute them without a vehicle and dilution. I have found that the diluent cannot be a liquid only but must consist of solid matter which will hold and disseminate the repellent chemical ingredients and provide a true distributing vehicle. Rather than use inert materials I have combined the active insect repellents with materials which are useful plant foods and useful soil conditioners. Thus the calcium supersulphate and the liquid sulphur (lime sulphur) are used both as soil conditioners and fertilizers. Further, the potassium sulphate, cotton seed meal and urea are all fertilizers and mulches. These substances disseminate in time and are not merely inactive bulk.

When the above ingredients are mixed, as above stated, a composition of matter is provided which is both useful and efficient and has characteristics, for the purposes intended, not found in any one of the substances alone.

The expression "liquid sulphur" as above used means an aqueous slurry of lime and sulphur in approximately equal proportions.

Similarly "lime sulphur paste" means a lime and sulphur mixture with little water, and "treble superphosphate" means calcium phosphate, Ca(H$_2$PO$_4$)$_2$.

I claim:

A composition of matter for repelling plant feeding insects consisting essentially of:

| | | |
|---|---|---|
| Stock molasses | gallons | 4 |
| Lime sulphur fluid mixture | do | 3½ |
| Creosote | do | ¼ |
| Pine tar | do | ¼ |
| Fuel oil | do | ¼ |
| Oil of pennyroyal | fluid ounce | ¼ |
| Dioctyl sodium sulfosuccinate | fluid ounce | ¼ |
| Calcium treble superphosphate | pounds | 205 |
| Potassium sulphate | do | 100 |
| Cotton seed meal | do | 50 |
| Urea | do | 100 |

References Cited in the file of this patent

UNITED STATES PATENTS

| | | |
|---|---|---|
| 52,844 | Gould | Feb. 27, 1866 |
| 1,609,070 | Dye | Nov. 30, 1926 |
| 2,218,695 | Leatherman | Oct. 22, 1940 |